United States Patent
Lee et al.

(10) Patent No.: US 12,304,426 B2
(45) Date of Patent: May 20, 2025

(54) FINGERPRINT DATA RESET SYSTEM AND FINGERPRINT DATA RESET METHOD

(71) Applicants: Hyundai Motor Company, Seoul (KR); Kia Corporation, Seoul (KR)

(72) Inventors: Jihye Lee, Hwaseong-si (KR); Dong June Song, Anyang-si (KR); Taeseung Kim, Incheon (KR)

(73) Assignees: HYUDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/060,175

(22) Filed: Nov. 30, 2022

(65) Prior Publication Data
US 2023/0242076 A1    Aug. 3, 2023

(30) Foreign Application Priority Data
Feb. 3, 2022 (KR) .................. 10-2022-0013973

(51) Int. Cl.
*B60R 25/25* (2013.01)
*B60R 25/23* (2013.01)

(52) U.S. Cl.
CPC ............ *B60R 25/252* (2013.01); *B60R 25/23* (2013.01); *B60R 2325/20* (2013.01); *B60R 2325/40* (2013.01)

(58) Field of Classification Search
CPC ... B60R 25/252; B60R 25/23; B60R 2325/20; B60R 2325/40
USPC ........................................ 340/5.52
See application file for complete search history.

(56) References Cited

U.S. PATENT DOCUMENTS

| | | | |
|---|---|---|---|
| 11,036,484 B2 | 6/2021 | Miller | |
| 2004/0124968 A1* | 7/2004 | Inada | B60R 25/257 340/5.72 |
| 2008/0030301 A1* | 2/2008 | Terao | B60R 25/04 340/5.53 |

FOREIGN PATENT DOCUMENTS

| | | | |
|---|---|---|---|
| CN | 106379273 A | * | 2/2017 |
| CN | 106878008 B | * | 1/2018 |
| CN | 108974192 A | * | 12/2018 |
| CN | 109532759 A | * | 3/2019 |
| CN | 109862040 A | * | 6/2019 |
| JP | 2002145019 A | | 5/2002 |

(Continued)

*Primary Examiner* — Kam Wan Ma
(74) *Attorney, Agent, or Firm* — MCDONNELL BOEHNEN HULBERT & BERGHOFF LLP

(57) ABSTRACT

A fingerprint data reset system that may reset registered fingerprint data through an on-board diagnostics includes: a vehicle including a first controller configured to authenticate input fingerprint data based on comparison between the input fingerprint data and registered fingerprint data; and the on-board diagnostics configured to communicate with a plurality of controllers of the vehicle through an in-vehicle communication network of the vehicle, wherein the on-board diagnostics is configured to transmit a fingerprint reset request signal to the first controller among the plurality of controllers based on receiving a user input for resetting the registered fingerprint data, and the first controller is configured to determine whether the user input is received from a user of the vehicle based on the fingerprint reset request signal, and reset the registered fingerprint data based on a determination that the user input is received from the user of the vehicle.

5 Claims, 8 Drawing Sheets

(56) References Cited

FOREIGN PATENT DOCUMENTS

| | | | |
|---|---|---|---|
| JP | 2004326689 | A | 11/2004 |
| JP | 2005092375 | A | 4/2005 |
| KR | 101673310 | B1 | 11/2016 |
| KR | 20170049738 | A | 5/2017 |
| KR | 20180057803 | A | 5/2018 |
| KR | 102275142 | B1 | 7/2021 |

\* cited by examiner

FINGERPRINT DATA RESET SYSTEM AND FINGERPRINT DATA RESET METHOD

CROSS-REFERENCE TO RELATED APPLICATION(S)

This application is based on and claims priority under 35 U.S.C. § 119 to Korean Patent Application No. 10-2022-0013973, filed on Feb. 3, 2022 in the Korean Intellectual Property Office, the disclosure of which is incorporated herein by reference.

TECHNICAL FIELD

The disclosure relates to a fingerprint data reset system and a fingerprint data reset method, and more specifically, to a fingerprint data reset system and a fingerprint data reset method through on-board diagnostics.

BACKGROUND

Fingerprint authentication technology, which is one of the biometric authentication technologies, is used to determine whether a user is a valid user based on fingerprint data obtained through a fingerprint sensor.

Recently, the fingerprint authentication technology is widely used in various areas such as security systems, mobile authentication systems, and vehicle access and starting systems due to the convenience and efficiency of fingerprint authentication technology.

In fingerprint-based vehicle access and starting systems, when an owner of a vehicle changes, registered fingerprint data of a former user is required to be reset.

However, in case a new owner does not know a password of the vehicle set by the former user, the registered fingerprint data may not be reset, causing an exposure to theft.

SUMMARY

An aspect of the disclosure provides a fingerprint data reset system and a fingerprint data reset method that may reset registered fingerprint data using on-board diagnostics, when an owner of a vehicle does not know a password of the vehicle.

Additional aspects of the disclosure will be set forth in part in the description which follows and, in part, will be obvious from the description, or may be learned by practice of the disclosure.

According to an embodiment of the disclosure, there is provided a fingerprint data reset system including: a vehicle including a fingerprint authentication control module configured to authenticate input fingerprint data based on comparison between the input fingerprint data and registered fingerprint data; and an on-board diagnostics configured to communicate with a plurality of electronic control units of the vehicle through an in-vehicle communication network of the vehicle, wherein the on-board diagnostics is configured to transmit a fingerprint reset request signal to the fingerprint authentication control module among the plurality of electronic control units based on receiving a user input for resetting the registered fingerprint data, and the fingerprint authentication control module is configured to determine whether the user input is received from a user of the vehicle based on the fingerprint reset request signal, and reset the registered fingerprint data based on a determination that the user input is received from the user of the vehicle.

Also, the fingerprint authentication control module is configured to transmit, to the on-board diagnostics, information indicating that the registered fingerprint data is reset, based on the reset registered fingerprint data.

Also, the fingerprint authentication control module is configured to transmit, to the on-board diagnostics, information indicating that the registered fingerprint data fails to be reset, based on a determination that the user input is not received from the user of the vehicle.

Also, the fingerprint reset request signal includes a personal identification number (PIN) and a vehicle identification number (VIN) input by the user, the fingerprint authentication control module is configured to generate an encryption value corresponding to the PIN and the VIN input by the user, and reset the registered fingerprint data, based on the generated encryption value matching a pre-stored encryption value which is set by encrypting a unique PIN and a unique VIN of the vehicle, and the unique PIN and the unique VIN of the vehicle are invariable with a setting of the user.

Also, the fingerprint reset request signal includes a command to request authentication of a digital key, the fingerprint authentication control module is configured to transmit a search request signal for requesting identification of a location of the digital key, to a digital key control module among the plurality of electronic control units, based on receiving the command to request authentication of the digital key, the digital key control module is configured to identify the location of the digital key, based on the search request signal being received from the fingerprint authentication control module, and transmit a positive signal to the fingerprint authentication control module based on the location of the digital key being identified to be located in the vehicle, and the fingerprint authentication control module is configured to reset the registered fingerprint data based on the positive signal being received from the digital key control module.

Also, the fingerprint authentication control module is configured to transmit a random number to the digital key control module based on the positive signal being received from the digital key control module, the digital key control module is configured to encrypt a pre-stored encryption value which is obtained by encrypting a unique PIN and a unique VIN of the vehicle, based on the random number received from the fingerprint authentication control module, and transmit the encrypted pre-stored encryption value to the fingerprint authentication control module, and the fingerprint authentication control module is configured to decrypt the encrypted pre-stored encryption value received from the digital key control module, based on the random number, and reset the registered fingerprint data based on the decrypted value including the pre-stored encryption value.

Also, the fingerprint reset request signal includes a command to request a biometric authentication other than fingerprint authentication, the fingerprint authentication control module is configured to transmit a result request signal for requesting a result of the biometric authentication, to a biometric authentication control module among the plurality of electronic control units, based on receiving the command to request the biometric authentication, the biometric authentication control module is configured to perform the biometric authentication, based on the result request signal being received from the fingerprint authentication control module, and transmit a positive signal to the fingerprint authentication control module based on the biometric authentication being successful, and the fingerprint authentication control module is configured to reset the registered fingerprint data based on the positive signal being received from the biometric authentication control module.

Also, the fingerprint authentication control module is configured to transmit a random number to the biometric authentication control module based on the positive signal being received from the biometric authentication control module, the biometric authentication control module is configured to encrypt a pre-stored encryption value which is obtained by encrypting a unique PIN and a unique VIN of the vehicle, based on the random number received from the fingerprint authentication control module, and transmit the encrypted pre-stored encryption value to the fingerprint authentication control module, and the fingerprint authentication control module is configured to decrypt the encrypted pre-stored encryption value received from the biometric authentication control module, based on the random number, and reset the registered fingerprint data based on the decrypted value including the pre-stored encryption value.

Also, the biometric authentication control module includes at least one of a face authentication control module, an iris authentication control module, a vein authentication control module or a voice recognition control module.

Also, the vehicle further includes a telematics terminal configured to provide a user interface for managing a registered fingerprint of the vehicle, and the telematics terminal is configured to transmit a request signal for resetting the registered fingerprint data to the fingerprint authentication control module, based on a password, included in a fingerprint reset command received through the user interface, matching a pre-stored password.

According to an embodiment of the disclosure, there is provided a fingerprint data reset method for resetting registered fingerprint data stored in a fingerprint authentication control module of a vehicle, the fingerprint data reset method including: communicating, by an on-board diagnostics, with a plurality of electronic control units of the vehicle through an in-vehicle communication network of the vehicle; transmitting, by the on-board diagnostics, a fingerprint reset request signal to the fingerprint authentication control module among the plurality of electronic control units based on receiving a user input for resetting the registered fingerprint data; and determining, by the fingerprint authentication control module, whether the user input is received from a user of the vehicle based on the fingerprint reset request signal, and resetting the registered fingerprint data based on a determination that the user input is received from the user of the vehicle.

Also, the fingerprint data reset method further includes: transmitting, by the fingerprint authentication control module, information indicating that the registered fingerprint data is reset to the on-board diagnostics, based on the reset registered fingerprint data.

Also, the fingerprint data reset method further includes: transmitting, by the fingerprint authentication control module, information indicating that the registered fingerprint data fails to be reset to the on-board diagnostics, based on a determination that the user input is not received from the user of the vehicle.

Also, the fingerprint reset request signal includes a PIN and a VIN input by the user, the resetting of the registered fingerprint data includes: generating an encryption value corresponding to the PIN and the VIN input by the user; and resetting the registered fingerprint data, based on the generated encryption value matching a pre-stored encryption value which is set by encrypting a unique PIN and a unique VIN of the vehicle, wherein the unique PIN and the unique VIN of the vehicle are invariable with a setting of the user.

Also, the fingerprint reset request signal includes a command to request authentication of a digital key, the resetting of the registered fingerprint data includes: transmitting, by the fingerprint authentication control module, a search request signal for requesting identification of a location of the digital key, to a digital key control module among the plurality of electronic control units, based on receiving the command to request authentication of the digital key; identifying, by the digital key control module, the location of the digital key, based on the search request signal being received from the fingerprint authentication control module, and transmitting a positive signal to the fingerprint authentication control module based on the location of the digital key being identified to be located in the vehicle; and resetting, by the fingerprint authentication control module, the registered fingerprint data based on the positive signal being received from the digital key control module.

Also, the resetting of the registered fingerprint data includes: transmitting, by the fingerprint authentication control module, a random number to the digital key control module based on the positive signal being received from the digital key control module; and encrypting, by the digital key control module, a pre-stored encryption value which is obtained by encrypting a unique PIN and a unique VIN of the vehicle, based on the random number received from the fingerprint authentication control module, and transmitting the encrypted pre-stored encryption value to the fingerprint authentication control module; and decrypting, by the fingerprint authentication control module, the encrypted pre-stored encryption value received from the digital key control module, based on the random number, and resetting the registered fingerprint data based on the decrypted value including the pre-stored encryption value.

Also, the fingerprint reset request signal includes a command to request a biometric authentication other than fingerprint authentication, the resetting of the registered fingerprint data includes: transmitting, by the fingerprint authentication control module, a result request signal for requesting a result of the biometric authentication, to a biometric authentication control module among the plurality of electronic control units, based on receiving the command to request the biometric authentication; performing, by the biometric authentication control module, the biometric authentication based on the result request signal being received from the fingerprint authentication control module, and transmitting a positive signal to the fingerprint authentication control module based on the biometric authentication being successful, and resetting, by the fingerprint authentication control module, the registered fingerprint data based on the positive signal being received from the biometric authentication control module.

Also, the resetting of the registered fingerprint data includes: transmitting, by the fingerprint authentication control module, a random number to the biometric authentication control module based on the positive signal being received from the biometric authentication control module; encrypting, by the biometric authentication control module, a pre-stored encryption value which is obtained by encrypting a unique PIN and a unique VIN of the vehicle, based on the random number received from the fingerprint authentication control module, and transmitting the encrypted pre-stored encryption value to the fingerprint authentication control module; and decrypting, by the fingerprint authentication control module, the encrypted pre-stored encryption value received from the biometric authentication control module, based on the random number, and resetting the registered fingerprint data based on the decrypted value including the pre-stored encryption value.

Also, the biometric authentication control module includes at least one of a face authentication control module, an iris authentication control module, a vein authentication control module or a voice recognition control module.

Also, the fingerprint data reset method further includes: providing, by a telematics terminal of the vehicle, a user interface for managing a registered fingerprint of the vehicle; and transmitting, by the telematics terminal, a request signal for resetting the registered fingerprint data to the fingerprint authentication control module, based on a password, included in a fingerprint reset command received through the user interface, matching a pre-stored password.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
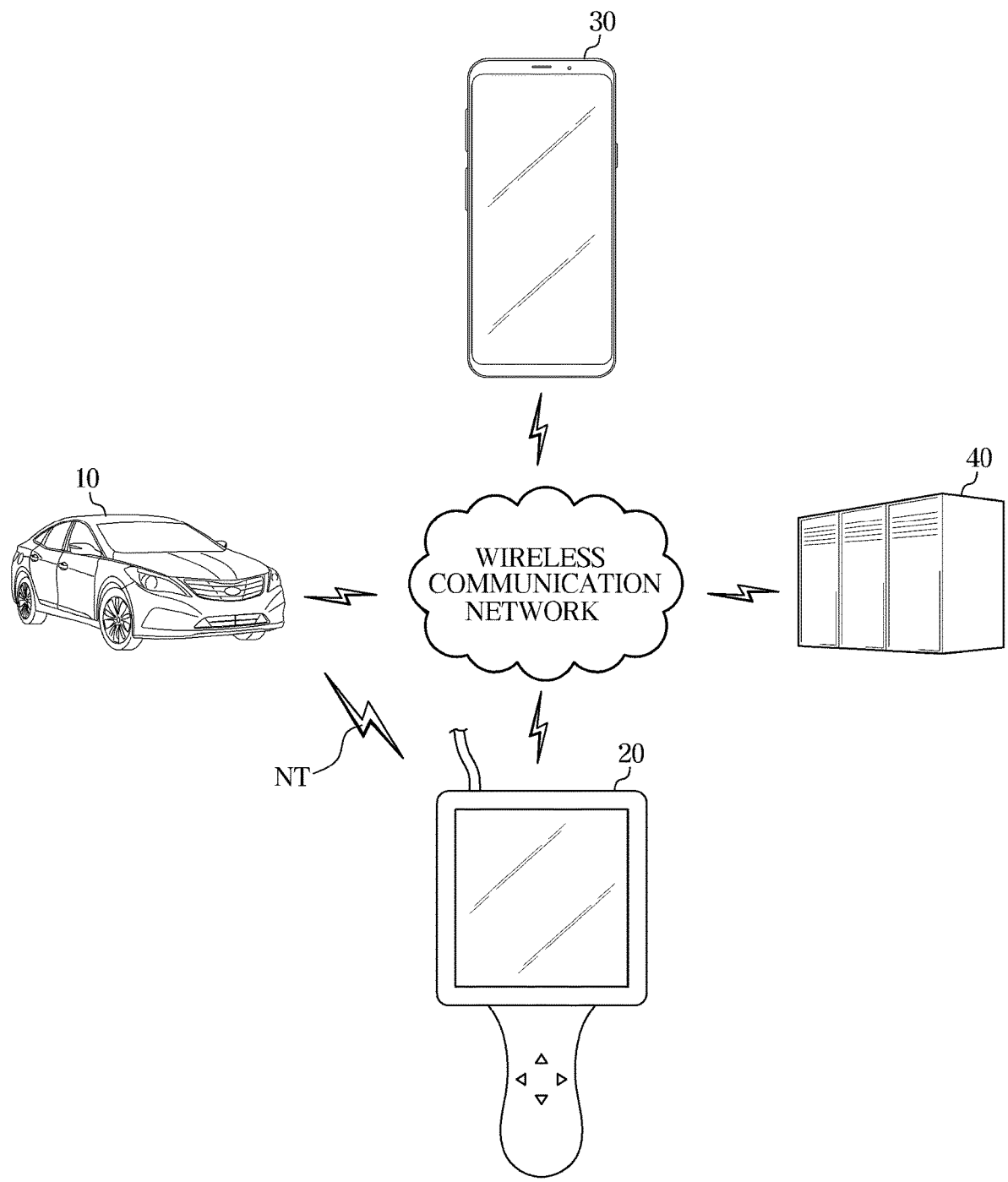
FIG. 1 illustrates an example of configuration of a fingerprint data reset system according to an embodiment.

Advantages and features of embodiments, and methods of achieving the same will be clearly understood with reference to the accompanying drawings and the following detailed embodiments. However, the present inventive concept is not limited to embodiments described herein, but may be implemented in various different forms. Embodiments are provided in order to explain the present inventive concept for those skilled in the art. The scope of the present inventive concept is defined by the appended claims.

The terms used herein will be briefly described and embodiments will be described in detail.

Although the terms used herein are selected from among general terms that are currently and widely used in consideration of functions in embodiments, these may be changed according to intentions or customs of those skilled in the art or the advent of new technology. In addition, in a specific case, some terms may be arbitrary selected by applicants. In this case, meanings thereof will be described in a corresponding description of embodiments. Therefore, the meanings of terms used herein should be interpreted based on substantial meanings of the terms and content of this entire specification, rather than simply the terms themselves.

Throughout this specification, when a certain part "includes" a certain component, it means that another component may be further included not excluding another component unless otherwise defined. Moreover, terms described in the specification such as "part" refer to a unit of processing at least one function or operation, and may be implemented by software, a hardware component such as a field-programmable gate array (FPGA) or an application-specific integrated circuit (ASIC), or a combination of software and hardware. However, the term "part" is not limited to software or hardware. "Part" may be configured in a recording medium that may be addressed or may be configured to be reproduced on at least one processor. Therefore, examples of the term "part" includes software components, object-oriented software components, components such as class components and task components, processes, functions, properties, procedures, subroutines, segments in program codes, drivers, firmware, microcode, circuits, data, databases, data structures, tables, arrays, and variables. The components and the modules may be provided into smaller number of components and modules such that the respective component and modules may be merged in respect to the functionality.

Hereinafter, embodiments of a fingerprint data reset system and a fingerprint data reset method will be described in detail with reference to the accompanying drawings. In addition, parts irrelevant to description are omitted in the drawings in order to clearly explain embodiments. In the accompanying drawings, parts that are identical or equivalent to each other will be assisted the same reference numerals, and in the following description of the embodiments, details of redundant descriptions thereof will be omitted.

FIG. 1 illustrates an example of configuration of a fingerprint data reset system according to an embodiment.

Referring to FIG. 1, a fingerprint data reset system according to an embodiment may include a vehicle 10, an on-board diagnostics 20, and/or a user terminal 30 and/or a server 40.

The vehicle 10 according to an embodiment may include a plurality of electronic control units (ECU) communicating with each other through an in-vehicle communication network (NT) of the vehicle 10.

The in-vehicle communication network (NT) of the vehicle 10 may include at least one of Ethernet, media oriented systems transport (MOST), a FlexRay, controller area network (CAN), local interconnect network (LIN), and the like.

The on-board diagnostics 20 is a device for diagnosing a state of the vehicle 10 and informing a diagnosis result, and may receive information about the state of the vehicle 10 and/or information about main systems of the vehicle 10 from a plurality of ECUs 110, 120 and 130 provided in the vehicle 10 through the in-vehicle communication network (NT) of the vehicle 10, and inform a user of the vehicle 10 of such information.

The on-board diagnostics 20 enables the user to see information about main systems of the vehicle 10 or information about failure, transmitted to the ECUs from sensors mounted on the vehicle 10 in accordance with OBD standard, through a console of the vehicle 10 or an external device, using a serial communication function.

For example, based on establishment of communication with the in-vehicle communication network (NT) of the vehicle 10, the on-board diagnostics 20 may request various ECUs of the vehicle 10 for information, receive and display the requested information.

That is, the on-board diagnostics 20 may perform communication with the plurality of ECUs 110, 120 and 130 provided in the vehicle 10 using the in-vehicle communication network (NT) of the vehicle 10.

To this end, the on-board diagnostics 20 may be connected to an OBD mounting part provided in the vehicle 10. The OBD mounting part may be provided below a steering wheel of the vehicle 10, without being limited thereto.

In an embodiment, the on-board diagnostics 20 may transmit information about the vehicle 10, received through the in-vehicle communication network (NT) of the vehicle 10, to an external electronic device (e.g. tablet PC) using a wireless communication (e.g. Bluetooth).

According to various embodiments, the vehicle 10 and/or the on-board diagnostics 20 may communicate with the user terminal 30 and/or the server 40 over a wireless communication network.

The user terminal 30 may include all kinds of handheld-based wireless communication devices such as a smartphone and a tablet PC, wearable devices such as a watch, ring, bracelet, anklet, necklace, eyeglasses, contact lenses, or head-mounted-device (HMD), and the like.

The use may manage a vehicle owned by the user through an application installed in the user terminal 30.

For example, the user may input a command to control a start of vehicle through the application installed in the user terminal 30, and the control command for controlling a start of vehicle may be transmitted to the vehicle through a wireless communication network.

A wireless communication network may refer to a communication network for performing wireless Internet communication such as wireless local access network (WLAN), wireless broadband (WiBro), Wi-Fi, world interoperability for microwave access (WIMAX), high speed downlink packet access (HSDPA), 3G communication, 4G communication such as long term evolution (LTE), 5G communication, and the like.

In an embodiment, the on-board diagnostics 20 may perform communication with the user terminal 30 through a short-range communication module (e.g. Bluetooth communication module).

In this case, the user terminal 30 may provide a user interface for diagnosing the vehicle 10 or changing a setting of the vehicle 10 through the on-board diagnostics 20.

The server 40 is for managing the vehicle 10, and may store information about the vehicle 10.

For example, the server 40 may store a personal identification number (PIN) and a vehicle identification number (VIN) of the vehicle 10.

In this specification, a PIN and a VIN of a vehicle refers to a unique value assigned to the vehicle in a manufacturing stage of the vehicle. That is, the PIN and the VIN of the vehicle may not be arbitrarily changed by a user, and a unique PIN and a unique VIN may be assigned to each vehicle.

In other words, the PIN and the VIN of the vehicle 10 are invariable with a setting of the user.

Accordingly, it is to be understood that a PIN which may be arbitrarily set by the user in a vehicle management application differs from the unique PIN of the vehicle 10 in this specification.

In an embodiment, the server 40 may store an encryption value matching a combination of the PIN and the VIN of the vehicle 10. The encryption value matching the combination of the PIN and the VIN of the vehicle 10 refers to a value obtained by encrypting the PIN and the VIN of the vehicle 10.

According to various embodiments, when information about the PIN and the VIN of the vehicle 10 and/or information about the encryption value matching the combination of the PIN and the VIN of the vehicle 10 is requested from an administrator terminal device, the server 40 may request identity authentication from a terminal device of an owner of the vehicle 10.

Based on success in identity authentication from the terminal device of the owner of the vehicle 10, the server 40 may transmit, to the administrator terminal device, the information about the PIN and the VIN of the vehicle 10 and/or the information about the encryption value matching the combination of the PIN and the VIN of the vehicle 10.

Figure 2:
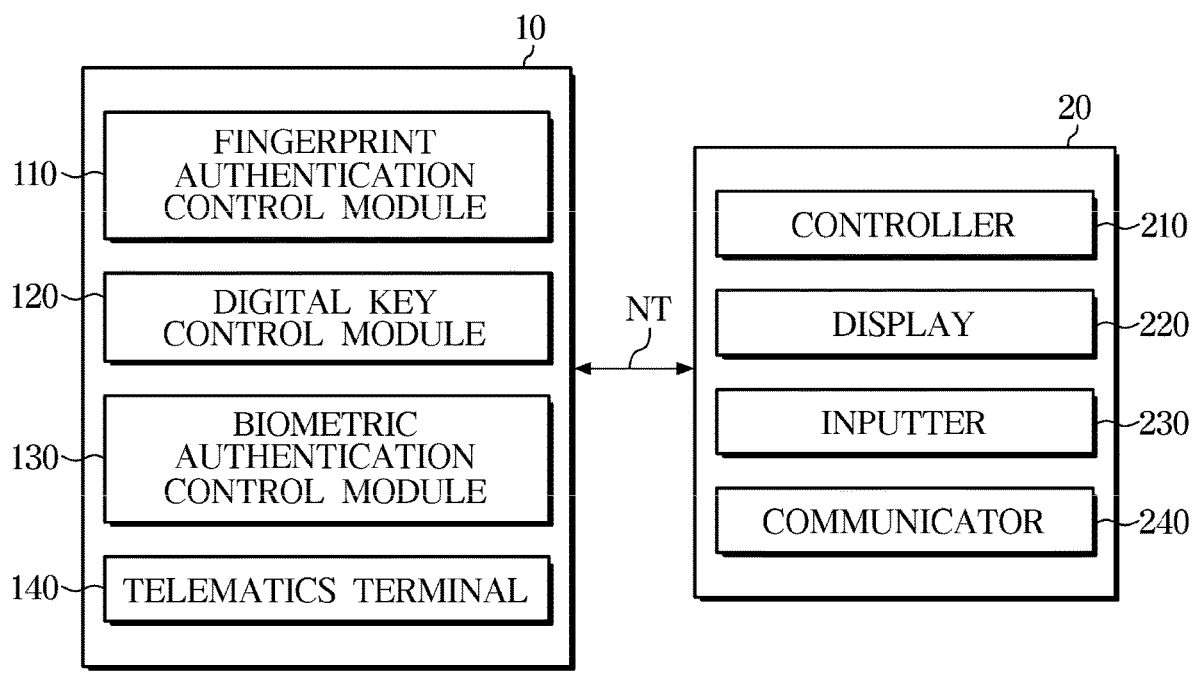
FIG. 2 is a block diagram illustrating configurations of a vehicle and an on-board diagnostics included in a fingerprint data reset system according to an embodiment.

FIG. 2 is a block diagram illustrating configurations of a vehicle and an on-board diagnostics included in a fingerprint data reset system according to an embodiment.

Referring to FIG. 2, the plurality of ECUs 110, 120 and 130 of the vehicle 10 may include the fingerprint authentication control module 110, the digital key control module 120 and/or the biometric authentication control module 130.

The fingerprint authentication control module 110 is an electronic control unit for performing functions (e.g. access function, start function, and/or payment function) of the vehicle 10 through fingerprint authentication.

The fingerprint authentication control module 110 may authenticate input fingerprint data based on comparison between a pre-stored registered fingerprint data and the input fingerprint data detected by a fingerprint sensor.

The fingerprint sensor may be provided outside (e.g. a door handle) of the vehicle 10 to detect the input fingerprint data for access control to the vehicle 10, and also provided inside (e.g. center fascia) of the vehicle 10 to detect the input fingerprint data for starting the vehicle 10 or performing a payment function.

In an embodiment, the fingerprint sensor may include a capacitive sensor and/or an ultrasonic sensor and/or an optical sensor.

A user may register user's fingerprint data in the fingerprint authentication control module 110 through a fingerprint registration process.

For example, a telematics terminal 140 of the vehicle 10 may output a user interface (e.g. a guide message) for performing the fingerprint registration process, and the user may proceed with the fingerprint registration process through the telematics terminal 140.

By inputting the user's fingerprint data through the fingerprint recognition sensor according to a guide provided by the telematics terminal 140, the user may register registered fingerprint data in the fingerprint authentication control module 110.

The fingerprint authentication control module 110 may store at least one piece of registered fingerprint data. For example, the fingerprint authentication control module 110 may store at least one piece of registered fingerprint data of each of a plurality of users, and a plurality of pieces of registered fingerprint data of a single user.

The fingerprint authentication control module 110 may include at least one memory storing a program performing the aforementioned operations or operations to be described later and at least one processor implementing a stored program.

The digital key control module 120 is an electronic control unit for performing functions (e.g. access function and/or start function) of the vehicle 10 through authentication of a digital key.

The digital key control module 120 may receive a signal transmitted from the digital key through a communication module (e.g. UWB module and/or Bluetooth module), and identify a location of the digital key based on an authentication signal transmitted from the digital key.

The authentication signal transmitted from the digital key may include an authentication code. The digital key control module 120 may authenticate the digital key based on the authentication code included in the authentication signal.

The digital key is a device including a communication module capable of transmitting an authentication signal corresponding to the vehicle 10, and may include a FOB key of the vehicle 10 and/or the user terminal 30. The user terminal 30 may be linked to the vehicle 10 through communication with the vehicle 10 and include a portable terminal capable of accessing the vehicle 10 through a network. For example, the user terminal 30 may include all kinds of handheld-based wireless communication devices such as a smartphone, etc., and wearable devices such as a watch, ring, bracelet, anklet, necklace, eyeglasses, contact lenses, head-mounted-device (HMD), and the like.

The digital key control module 120 may determine the location of the digital key using a time of flight (ToF) method with respect to a signal received from the digital key through a communication module. In addition, the digital key control module 120 may determine the location of the digital key using a time of arrival (TOA) method, a time difference of arrival (TDOA) method, an angle of arrival (AOA) method, or a received signal strength indicator (RSSI) method.

To this end, a plurality of communication modules for communicating with the digital may be provided.

For example, when the communication module is implemented as a UWB module, the UWB module may include a plurality of outdoor UWB modules, provided outside the vehicle 10, and a plurality of indoor UWB modules provided inside the vehicle 10.

When the plurality of UWB modules are provided, the digital key control module 120 may determine the exact location of the digital key as well as a distance between the vehicle 10 and the digital key. For example, the digital key control module 120 may determine a distance between a smart key and each of three UWB modules based on an authentication signal received from each of the three UWB modules, and determine an exact location of the digital key based on the distance between the digital key and each of the UWB modules.

The digital key control module 120 may determine whether the digital key is located inside or outside of the vehicle 10.

The biometric authentication control module 130 is an electronic control unit for performing functions (e.g. access function, start function, and/or payment function) of the vehicle 10 through biometric authentication other than fingerprint.

For example, the biometric authentication control module 130 may include a face authentication control module, an iris authentication control module, a vein authentication control module and/or a voice recognition control module.

In an embodiment, when the biometric authentication control module 130 corresponds to a face authentication control module, the biometric authentication control module 130 may authenticate an input face image, based on comparison between a pre-stored reference face image and the input face image obtained from a camera.

The camera may be provided in the vehicle 10 at a location to easily capture a user's face.

For example, the camera may be provided on an A-pillar at a driver's seat side and/or on an B-pillar of the vehicle 10 to capture a user located inside and/or outside the door of the vehicle 10.

The biometric authentication control module 130 may calculate a similarity score based on the comparison between the pre-stored reference face image and the input face image obtained from the camera, and determine that the face authentication is successful based on the similarity score greater than a threshold value.

In an embodiment, when the biometric authentication control module 130 corresponds to an iris authentication control module, the biometric authentication control module 130 may authenticate input iris data based on comparison between pre-stored reference iris data and the input iris data obtained from the camera.

In an embodiment, when the biometric authentication control module 130 corresponds to a vein authentication control module, the biometric authentication control module 130 may authenticate an input vein image pattern based on comparison between a pre-stored reference vein image pattern and the input vein image pattern obtained from an infrared camera.

The infrared camera may be provided in the vehicle 10 at a location where a user may easily place a user's finger or palm.

In an embodiment, when the biometric authentication control module 130 corresponds to a voice recognition control module, the biometric authentication control module 130 may authenticate input voice data based on comparison between pre-stored voice data and the voice data obtained through a microphone.

For example, the biometric authentication control module 130 may authenticate input voice data based on comparison between a frequency band of pre-stored voice data and a frequency band of voice data obtained through the microphone.

The microphone may be provided in the vehicle 10 at a location to easily receive a user's voice.

The telematics terminal 140 may communicate with the external server 40 and/or the user terminal 30 using a wireless communication network.

Also, the telematics terminal 140 may include a user interface part (e.g. a display and an inputter). Accordingly, the telematics terminal 140 may provide a user interface for changing various settings of the vehicle 10.

For example, the telematics terminal 140 may provide a user interface for managing a registered fingerprint of the vehicle 10.

The user may set a password for changing settings of the vehicle 10 using the telematics terminal 140, and the telematics terminal 140 may store the password input by the user.

When a password is set for the telematics terminal 140, the user is required to input the password when changing the settings of the vehicle 10.

For example, when a user desires to reset a fingerprint through the user interface for managing the registered fingerprint of the vehicle 10, the user is required to input the password.

Based on a password, included in a fingerprint reset command received through the user interface, matching a pre-stored password, the telematics terminal 140 may transmit a request signal for resetting registered fingerprint data to the fingerprint authentication control module 110.

When an owner of the vehicle 10 is changed, in an event of not knowing a password of the vehicle 10 set by a former owner through the telematics terminal 140, a new owner is incapable of resetting the registered fingerprint data.

Also, when an owner of the vehicle 10 forgets a password of the vehicle 10 set by the owner itself, the registered fingerprint data may not be reset.

According to an embodiment, as will be described later, even when a user that desires to reset the registered fingerprint data forgets the password of the vehicle 10, the user may reset the registered fingerprint data by authenticating that the user is the owner of the vehicle 10 through an on-board diagnostics.

Each of the plurality of ECUs 110, 120 and 130 of the vehicle 10 may include at least one memory storing a program performing respective functions and at least one processor implementing a stored program.

Also, each of the plurality of ECUs 110, 120 and 130 of the vehicle 10 may store information about a unique PIN and/or a unique VIN of the vehicle 10 and/or an encryption value which is obtained by encrypting the PIN and the VIN.

For example, the encryption value obtained by encrypting the PIN and the VIN of the vehicle 10 may be previously stored in each of the plurality of ECUs 110, 120 and 130 of the vehicle 10.

The on-board diagnostics 20 may include a controller 210 controlling operations of the on-board diagnostics 20, a display 220 providing a user interface for diagnosing a state of the vehicle 10 or changing settings of the vehicle 10, an inputter 230 receiving various user inputs and/or a communicator 240.

Also, the on-board diagnostics 20 may include a connector that may be connected to an OBD mounting part (e.g. a port) provided in the vehicle 10. The connector may include a jack that may be connected to the OBD mounting part.

When the connector of the on-board diagnostics 20 is connected to the OBD mounting part provided in the vehicle 10, the on-board diagnostics 20 may communicate with the plurality of ECUs 110, 120 and 130 of the vehicle 10 through an in-vehicle communication network (NT) of the vehicle 10.

The controller 210 may include at least one memory storing a program controlling operations of the on-board diagnostics 20 and at least one processor implementing a stored program.

The display 220 may output a variety of user interfaces such as a user interface for checking a state of the vehicle 10 and/or a user interface for changing settings of the vehicle 10.

The inputter 230 may receive various user inputs for controlling the on-board diagnostics 20 from a user. For example, the inputter 230 may be provided as a tact switch, joystick, push switch, slide switch, toggle switch, micro switch, or touchscreen.

The communicator 240 may include a long-distance communication module and/or a short-range communication module for exchanging data with an external device (e.g. the user terminal 30).

For example, the communicator 240 may include a Bluetooth communication module.

According to various embodiments, the on-board diagnostics 20 may only include the communicator 240, without the display 220 and/or the inputter 230.

In this case, the on-board diagnostics 20 may perform various functions based on a user input received from the user terminal 30 through the communicator 240.

The on-board diagnostics 20 may transmit a control command to the plurality of ECUs 110, 120 and 130 based on a user input received through the inputter 230 and/or a user input received through the communicator 240.

For example, the controller 210 may transmit a fingerprint reset request signal to the fingerprint authentication control module 110 among the plurality of ECUs 110, 120 and 130 through an in-vehicle communication network (NT), based on receiving a user input for resetting registered fingerprint data.

The above-described constituent components of the vehicle 10 and the on-board diagnostics 20 may be omitted or other constituent components may be newly added within a general technical scope.

Figure 3:
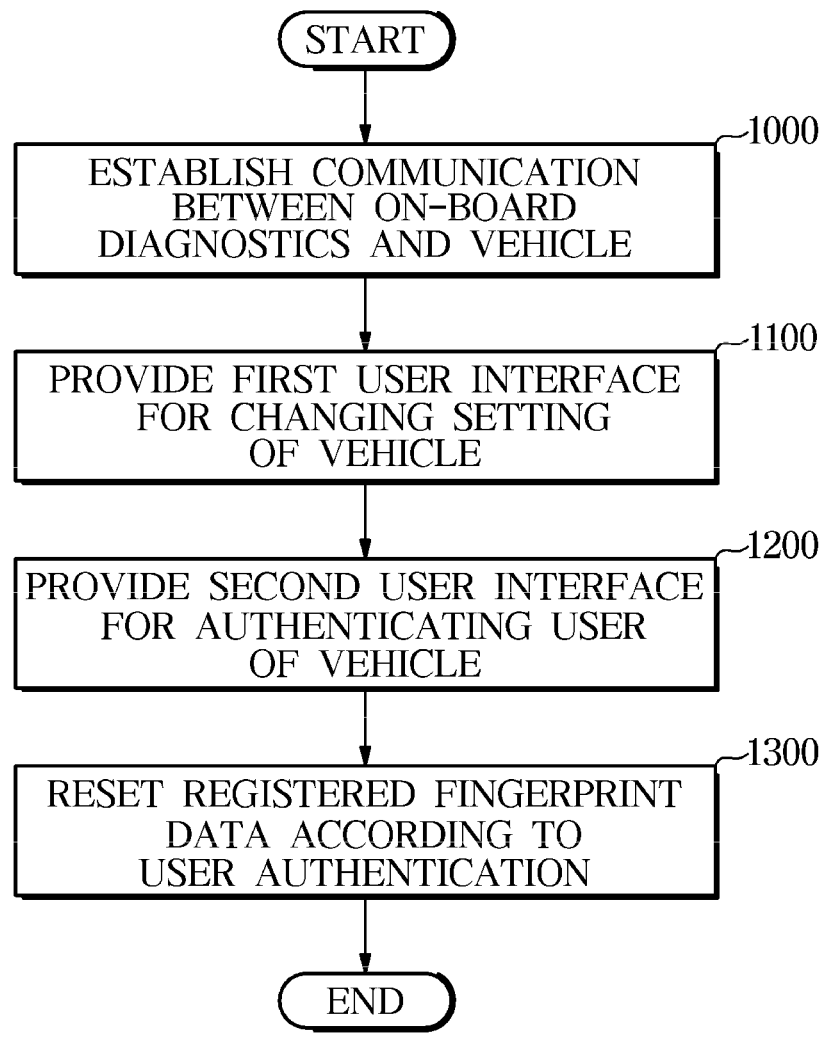
FIG. 3 is a flowchart illustrating an example of a fingerprint data reset method according to an embodiment.
Figure 4:
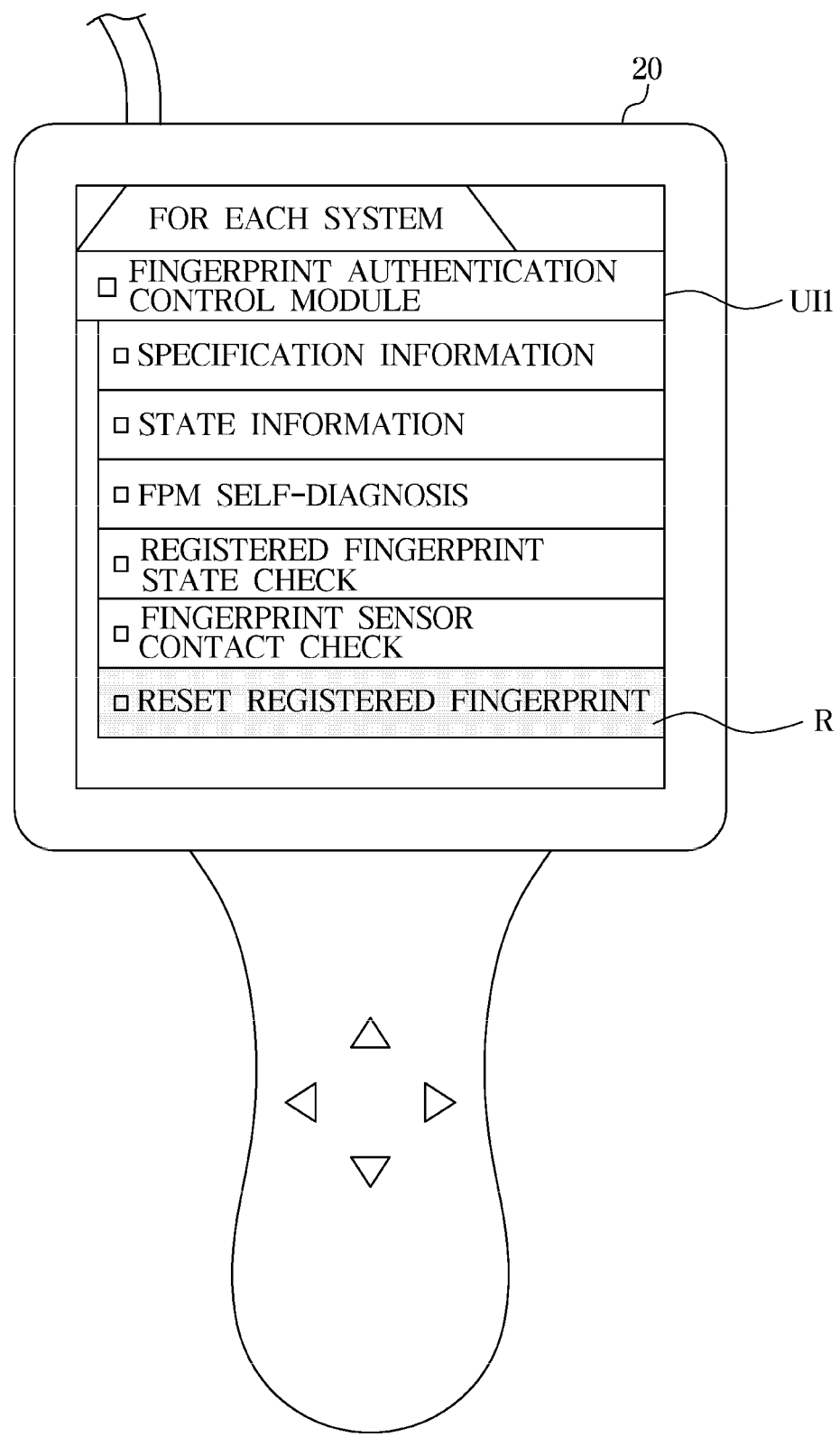
FIG. 4 illustrates an example of a user interface provided through an on-board diagnostics according to an embodiment.
Figure 5:
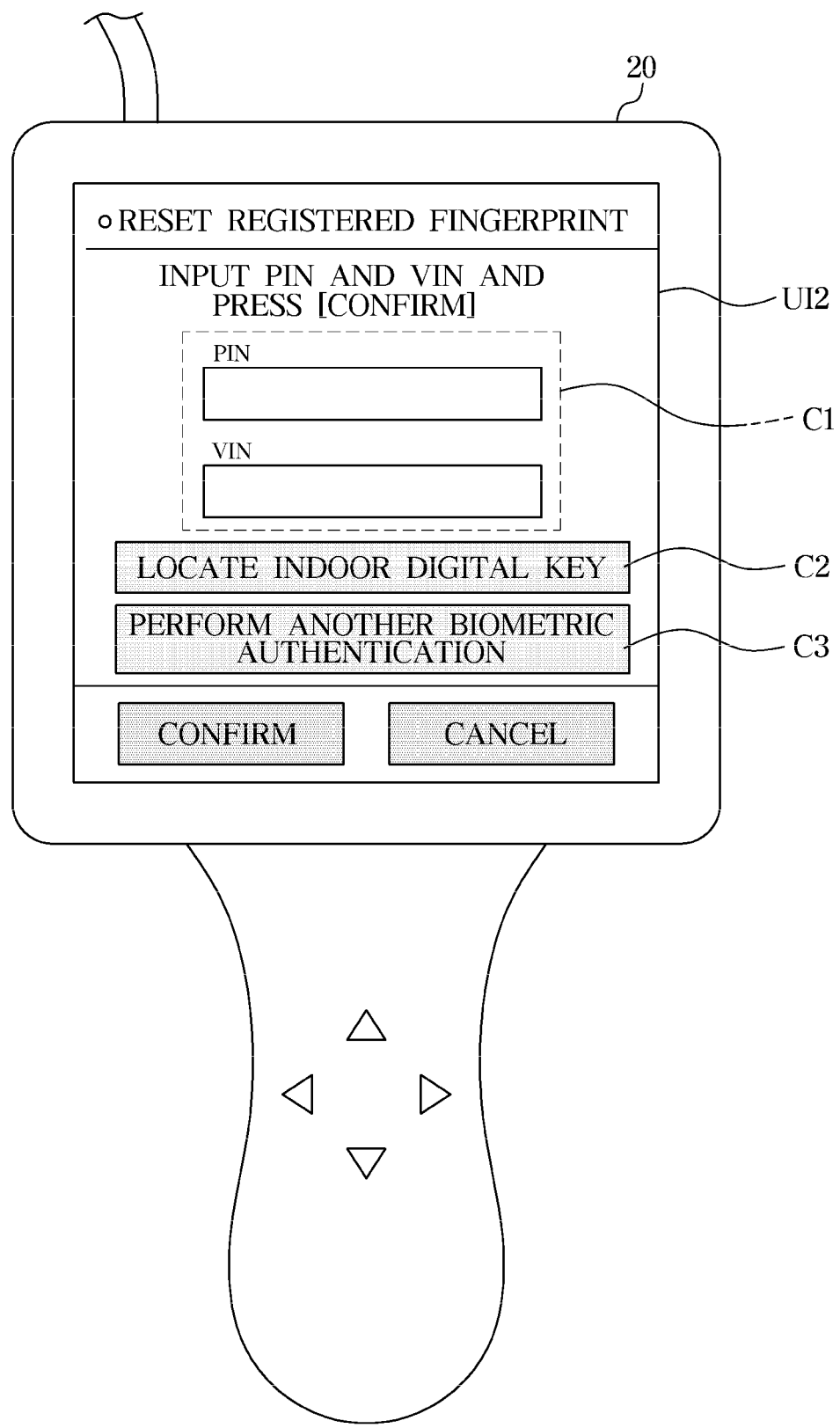
FIG. 5 illustrates another example of a user interface provided through an on-board diagnostics according to an embodiment.

FIG. 3 is a flowchart illustrating an example of a fingerprint data reset method according to an embodiment. FIG. 4 illustrates an example of a user interface provided through an on-board diagnostics according to an embodiment. FIG. 5 illustrates another example of a user interface provided through an on-board diagnostics according to an embodiment.

Referring to FIG. 3, the on-board diagnostics 20 may establish communication with an in-vehicle communication network (NT) of the vehicle 10 (1000).

For example, a user may connect the on-board diagnostics 20 to the in-vehicle communication network (NT) of the vehicle 10 by connecting the on-board diagnostics 20 to an OBD mounting part provided in the vehicle 10.

The on-board diagnostics 20 may provide a first user interface UI1 for changing settings of the vehicle 10 based on the establishment of communication with the in-vehicle communication network (NT) of the vehicle 10 (1100).

For example, the display 220 of the on-board diagnostics 20 may output the first user interface UI1.

As another example, an external device (e.g. the user terminal 30) where a communication with the on-board diagnostics 20 is established through the communicator 240 may output the first user interface UI1.

Referring to FIG. 4, the first user interface UI1 for changing the settings of the vehicle 10 may include a plurality of elements for diagnosing the fingerprint authentication control module 110 or managing registered fingerprint data registered in the fingerprint authentication control module 110.

For example, the first user interface UI1 may include at least one of an element for checking a specification of the fingerprint authentication control module 110, an element for checking a state of the fingerprint authentication control module 110, an element for providing a guide to diagnose whether the fingerprint authentication control module 110 operates normally, an element for checking a state of the registered fingerprint data, an element for diagnosing an operation of a fingerprint sensor, and/or an element R for resetting the registered fingerprint data.

According to various embodiments, the first user interface UI1 may be provided through an external device (e.g. the user terminal 30) where a communication (e.g. Bluetooth communication) with the on-board diagnostics 20 is established.

A user that desires to reset the registered fingerprint data may select the element R for resetting a registered fingerprint.

Based on the selection of the element R for resetting the registered fingerprint, the on-board diagnostics 20 may provide a second user interface UI2 for authenticating a user of the vehicle 10 (1200).

For example, the display 220 of the on-board diagnostics 20 may output the second user interface UI2.

As another example, an external device (e.g. the user terminal 30) where a communication with the on-board diagnostics 20 is established through the communicator 240 may output the second user interface UI2.

Referring to FIG. 5, the second user interface UI2 may include at least one element corresponding to at least one method for authenticating the user.

For example, the second user interface UI2 may include at least one of an element C1 for receiving a unique PIN and a unique VIN of the vehicle 10, an element C2 for authenticating the user through a location of a digital key, and/or an element C3 for authenticating the user through biometric authentication.

The user may input the unique PIN and the unique VIN of the vehicle 10 through the first element C1.

As described above, based on the success in identity authentication from the terminal device of the owner of the vehicle 10, the server 40 may transmit, to the administrator terminal device, information about the PIN and the VIN of the vehicle 10 and/or information about the encryption value matching the combination of the PIN and the VIN of the vehicle 10.

An administrator may check the PIN and the VIN of the vehicle 10 through the administrator terminal device, and input to the on-board diagnostics 20 through the first element C1.

Also, the user may perform identity authentication using the digital key through the second element C2.

For example, based on a user's selection on the second element C2, the display 220 of the on-board diagnostics 20 and/or the external device where a communication with the on-board diagnostics 20 is established may output a visual indication for guiding how to perform identity authentication using the digital key.

For example, the visual indication for guiding how to perform identity authentication using the digital key may include text, animation, image and/or video.

The method for performing identity authentication using the digital key may include positioning the digital key to which an authentication code is provided inside the vehicle 10 by the user.

The user checks the visual indication for guiding how to perform identity authentication using the digital key and places the digital key inside the vehicle 10, thereby may perform identity authentication.

Also, the user may perform identity authentication using a biometric authentication other than fingerprint authentication through the third element C3.

For example, based on a user's selection on the third element C3, the display 220 of the on-board diagnostics 20 and/or the external device where a communication with the on-board diagnostics 20 is established may output a visual indication for guiding how to perform identity authentication using biometric authentication.

For example, the visual indication for guiding how to perform identity authentication using biometric authentication may include text, animation, image and/or video.

The method of performing identity authentication using biometric authentication may include user's input of biometric information (e.g. face image and/or iris data) through a biometric authentication means (e.g. camera) provided in the vehicle 10.

The user checks the visual indication for guiding how to perform identity authentication using biometric authentication and performs face authentication and/or iris authentication through the vehicle 10, thereby may perform identity authentication.

The fingerprint authentication control module 110 may reset the registered fingerprint data according to a user authentication, based on a fingerprint reset request signal for resetting the registered fingerprint data received from the on-board diagnostics 20 (1300).

In an embodiment, based on the fingerprint reset request signal received from the on-board diagnostics 20, the fingerprint authentication control module 110 may determine whether the user input for resetting the registered fingerprint data is received from a real user of the vehicle 10, and reset the registered fingerprint data based on a determination that the user input is received from the real user of the vehicle 10.

In this instance, the real user of the vehicle 10 refers to a current owner of the vehicle 10, and the fingerprint authentication control module 110 may determine the real user of the vehicle 10 based on a PIN and a VIN input from the user that match the unique PIN and the unique VIN of the vehicle 10, a success in identity authentication through the digital key, and a success in identity authentication through biometric authentication.

The fingerprint authentication control module 110 may transmit, to the on-board diagnostics 20, information indicating that the registered fingerprint data is reset, based on the success in resetting the registered fingerprint data.

For example, the fingerprint authentication control module 110 may reset the registered fingerprint data based on a determination that one that desires to reset the registered fingerprint data is a real user, and transmit information indicating that the registered fingerprint data is reset to the on-board diagnostics 20, based on the reset registered fingerprint data.

Also, based on a failure in resetting the registered fingerprint data, the fingerprint authentication control module 110 may transmit, to the on-board diagnostics 20, information indicating that the registered fingerprint data fails to be reset.

For example, the fingerprint authentication control module 110 may transmit the information indicating that the registered fingerprint data fails to be reset to the on-board diagnostics 20, based on a determination that the one that desires to reset the registered fingerprint data is not a real owner of the vehicle 10.

The on-board diagnostics 20 receiving the information about the success in resetting the registered fingerprint data and/or the information about the failure in resetting the registered fingerprint data may output, through the display 220, a visual indication indicating that the registered fingerprint data has been successfully reset and/or a visual indication indicating that the registered fingerprint data has failed to be reset.

As another example, the on-board diagnostics 20 receiving the information about the success in resetting the registered fingerprint data and/or the information about the failure in resetting the registered fingerprint data may transmit, through the communicator 240, the information about the success in resetting the registered fingerprint data and/or the information about the failure in resetting the registered fingerprint data, to the external device where a communication is established.

As will be described later, the fingerprint authentication control module 110 may select a user authentication method according to a user input received through the second user interface UI2, and reset the registered fingerprint data only when the user is authenticated based on the selected user authentication method.

Hereinafter, described are operations of the on-board diagnostics 20 and the vehicle 10, when a user requests to reset registered fingerprint data by inputting a PIN and a VIN through the first element C1, when the user requests to reset registered fingerprint data by performing authentication using a digital key through the second element C2, and when the user requests to reset registered fingerprint data by performing biometric authentication through the third element C3.

Figure 6:
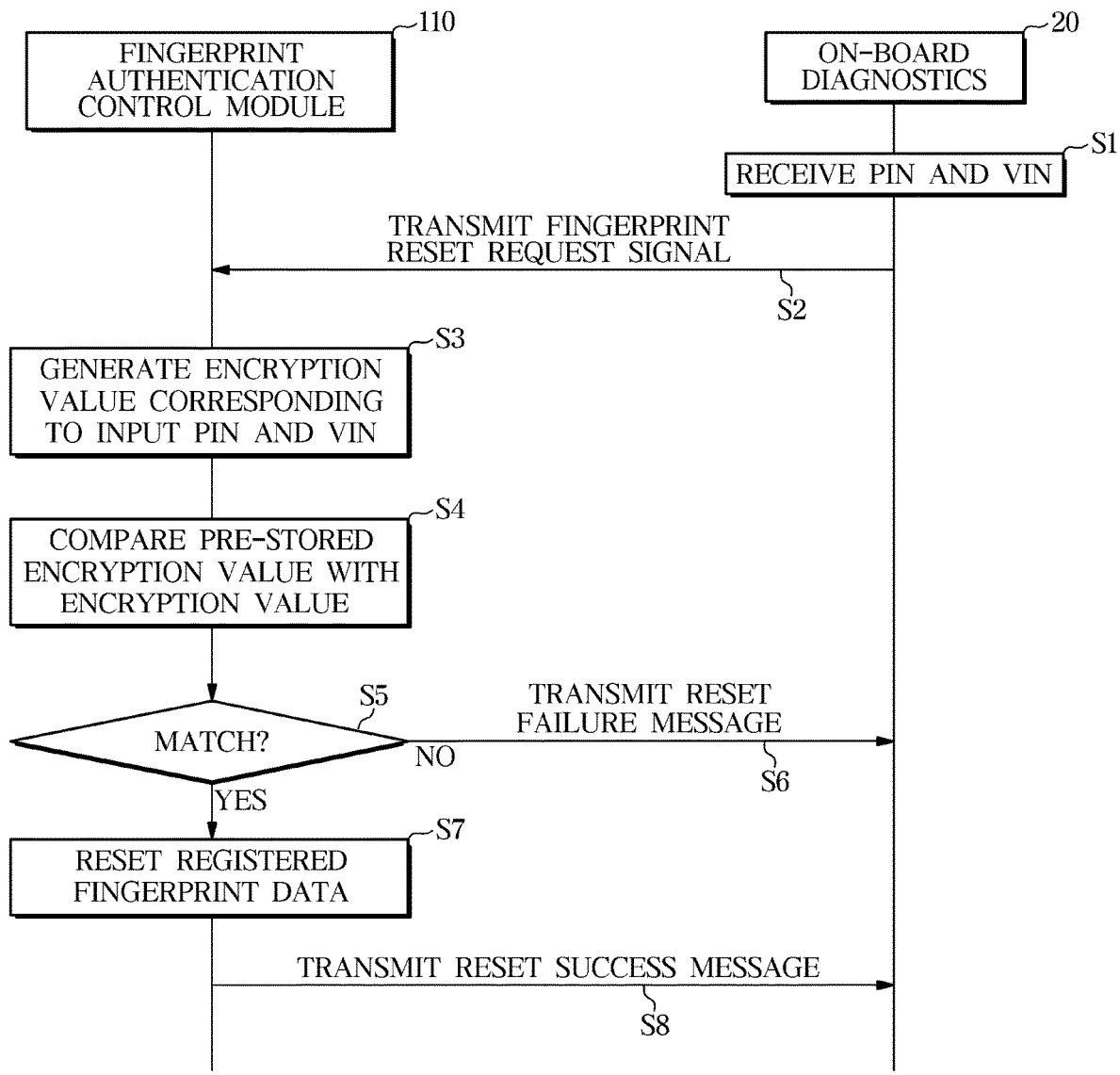
FIG. 6 is a flowchart illustrating operations of resetting registered fingerprint data through a PIN and a VIN of a vehicle by a fingerprint data reset system according to an embodiment.

FIG. 6 is a flowchart illustrating operations of resetting registered fingerprint data through a PIN and a VIN of a vehicle by a fingerprint data reset system according to an embodiment.

Referring to FIG. 6, a user may input a PIN and a VIN through the first element C1.

The on-board diagnostics 20 may receive the PIN and the VIN input from the user (S1).

Afterwards, the user may finally request to reset registered fingerprint data by selecting a button for executing the reset of the registered fingerprint data.

In this instance, the user input for resetting the registered fingerprint data may include an input of the PIN and the VIN and an input for selecting the button for executing the reset of the registered fingerprint data.

The on-board diagnostics 20 may transmit a fingerprint reset request signal to the fingerprint authentication control module 110 (S2), based on receiving the user input for resetting the registered fingerprint data. In this instance, the fingerprint reset request signal may include information about the PIN and the VIN input from the user.

The fingerprint authentication control module 110 may generate an encryption value corresponding to the PIN and the VIN included in the fingerprint reset request signal (S3), based on the fingerprint reset request signal received from the on-board diagnostics 20.

To this end, the fingerprint authentication control module 110 may use a preset encryption method.

The PIN and the VIN of the vehicle 10 may be encrypted and stored in the plurality of ECUs 110, 120 and 130 in a manufacturing stage of the vehicle 10, and the plurality of ECUs 110, 120 and 130 of the vehicle 10 may store an algorithm for encrypting the PIN and the VIN of the vehicle 10 and/or an algorithm for decrypting an encryption value.

That is, the plurality of ECUs 110, 120 and 130 may store an encryption value (hereinafter, "pre-stored encryption value") which is set by encrypting a unique PIN and a unique VIN of the vehicle 10.

The fingerprint authentication control module 110 may compare the pre-stored encryption value with the encryption value corresponding to the PIN and the VIN included in the fingerprint reset request signal (S4).

The fingerprint authentication control module 110 may transmit a reset failure message to the on-board diagnostics 20 (S6), based on the pre-stored encryption value not matching the encryption value corresponding to the PIN and the VIN included in the fingerprint reset request signal (No in S5).

That is, based on the pre-stored encryption value not matching the encryption value corresponding to the PIN and the VIN included in the fingerprint reset request signal (No in S5), the fingerprint authentication control module 110 may determine that the user input for resetting the registered fingerprint data is not received from a real user of the vehicle 10.

The fingerprint authentication control module 110 may reset the registered fingerprint data (S7), based on the pre-stored encryption value matching the encryption value corresponding to the PIN and the VIN included in the fingerprint reset request signal (Yes in S5).

That is, based on the pre-stored encryption value matching the encryption value corresponding to the PIN and the VIN included in the fingerprint reset request signal (Yes in S5), the fingerprint authentication control module 110 may determine that the user input for resetting the registered fingerprint data is received from a real user of the vehicle 10.

The fingerprint authentication control module 110 may transmit a reset success message to the on-board diagnostics 20 (S8), based on a success in resetting the registered fingerprint data.

According to the disclosure, by resetting the registered fingerprint data using the PIN and the VIN that may be obtained only by the real user through identity authentication, the registered fingerprint data may be reset only by an authenticated user, and thus security of the fingerprint authentication control module may be enhanced.

Also, according to the disclosure, the fingerprint authentication control module makes comparison with the encryption value pre-stored by encrypting the PIN and the VIN, thereby preventing others from hacking into an in-vehicle network to steal the PIN and the VIN of the vehicle from the fingerprint authentication control module.

Figure 7:
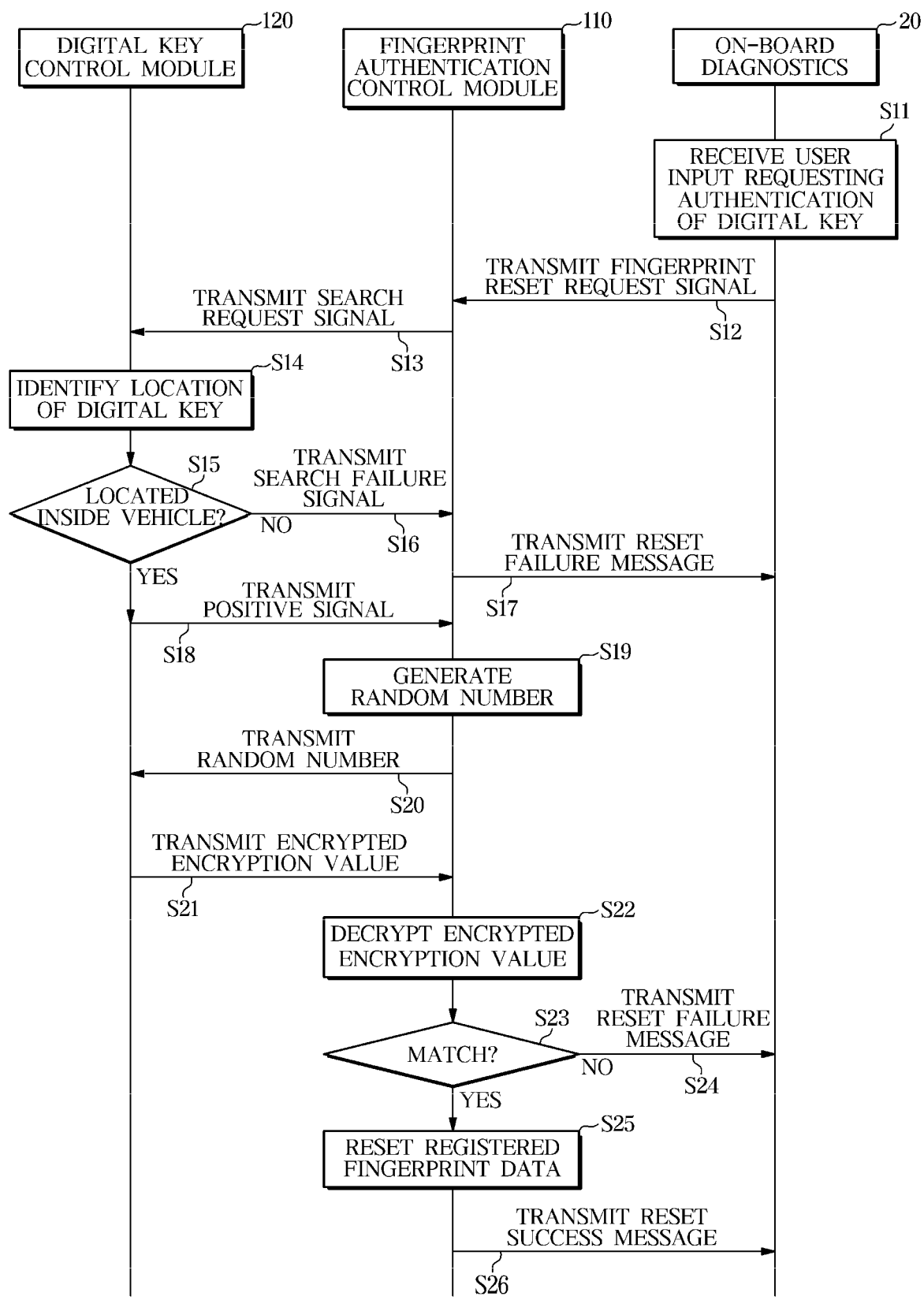
FIG. 7 is a flowchart illustrating operations of resetting registered fingerprint data through a digital key control module by a fingerprint data reset system according to an embodiment.

FIG. 7 is a flowchart illustrating operations of resetting registered fingerprint data through a digital key control module by a fingerprint data reset system according to an embodiment.

Referring to FIG. 7, a user may request authentication of a digital key through the second element C2.

According to a user's selection on the second element C2, the on-board diagnostics 20 may receive a user input requesting the authentication of the digital key from the user (S11).

In this instance, a user input for resetting registered fingerprint data may include the user input requesting the authentication of the digital key.

The on-board diagnostics 20 may transmit a fingerprint reset request signal to the fingerprint authentication control module 110 (S12), based on receiving the user input for resetting registered fingerprint data. In this instance, the fingerprint reset request signal may include a command requesting the authentication of the digital key.

The fingerprint authentication control module 110 may transmit, to the digital key control module 120, a search request signal for requesting an identification of a location of the digital key (S13), based on receiving the fingerprint reset request signal including the command requesting the authentication of the digital key.

The digital key control module 120 may perform authentication through the identification of the location of the digital key, based on the search request signal received from the fingerprint authentication control module 110.

To this end, the digital key control module 120 may identify the location of the digital key (S14), based on receiving the search request signal.

As described above, the digital key control module 120 may identify the location of the digital key using various methods.

The digital key control module 120 may transmit a search failure signal to the fingerprint authentication control module 110 (S16), based on the location of the digital key not being identified or the digital key being identified to be located outside of the vehicle 10 (No in operation S15).

For example, based on the location of the digital key not being identified until a preset period of time (e.g. one minute) has elapsed from a time of receiving the search request signal, or based on the digital key being identified to be located outside of the vehicle 10, the digital key control module 120 may transmit the search failure signal to the fingerprint authentication control module 110 (S16).

The fingerprint authentication control module 110 may transmit a reset failure message to the on-board diagnostics 20 (S17), based on receiving the search failure signal.

The digital key control module 120 may transmit a positive signal to the fingerprint authentication control module 110 (S18), based on the digital key being identified to be located inside the vehicle 10 (Yes in operation S15).

For example, based on the digital key being identified to be located inside the vehicle 10 within a preset period of time (e.g. one minute) from a time of receiving the search request signal, the digital key control module 120 may transmit the positive signal to the fingerprint authentication control module 110 (S18).

As illustrated in FIG. 7, according to various embodiments, the fingerprint authentication control module 110 may reset the registered fingerprint data (S25), based on the positive signal received from the digital key control module 120.

That is, in an embodiment, based on the digital key being identified to be located inside the vehicle 10, the fingerprint authentication control module 110 may determine that the user input for resetting the registered fingerprint data is received from a real user of the vehicle 10.

In another embodiment, as illustrated in FIG. 7, even when the positive signal is received from the digital key control module 120, the fingerprint authentication control module 110 may proceed with additional processes, thereby blocking an unauthenticated user.

For example, based on the positive signal received from the digital key control module 120, the fingerprint authentication control module 110 may generate a random number (S19), and transmit the generated random number to the digital key control module 120 (S20).

In this instance, the fingerprint authentication control module 110 may generate the random number using an algorithm for generating a random number, and temporarily store information about the generated random number.

Based on the random number received from the fingerprint authentication control module 110, the digital key control module 120 may encrypt a pre-stored encryption value which is obtained by encrypting a unique PIN and a unique VIN of the vehicle 10, and transmit the encrypted pre-stored encryption value to the fingerprint authentication control module 110 (S21).

That is, the digital key control module 120 may encrypt the pre-stored encryption value once again, based on the random number.

To this end, the plurality of ECUs 110, 120 and 130 of the vehicle 10 may store an algorithm for encrypting the pre-stored encryption value based on the random number and/or an algorithm for decrypting the pre-stored encryption value based on the random number.

The fingerprint authentication control module 110 may decrypt the encrypted pre-stored encryption value received from the digital key control module 120 (S22).

For example, the fingerprint authentication control module 110 may decrypt the encrypted pre-stored encryption value, received from the digital key control module 120, based on the random number transmitted by the fingerprint authentication control module 110 itself to the digital key control module 120 (S22).

The fingerprint authentication control module 110 may transmit a reset failure message to the on-board diagnostics (S24), based on a value obtained by decrypting the encrypted pre-stored encryption value received from the digital key control module 120 (hereinafter, 'decrypted value') not including the pre-stored encryption value (No in operation S23).

The fingerprint authentication control module 110 may reset the registered fingerprint data (S25), based on the decrypted value including the pre-stored encryption value (Yes in operation S23).

Also, the fingerprint authentication control module 110 may transmit a reset success message to the on-board diagnostics 20 (S26), based on a success in resetting the registered fingerprint data.

According to the disclosure, a real user may easily perform identity authentication through a digital key which is an authentication means other than a PIN and VIN.

Also, according to the disclosure, the pre-stored encryption value is encrypted once again based on a random number, thereby preventing others from hacking into an in-vehicle network to steal the pre-stored encryption value.

Figure 8:
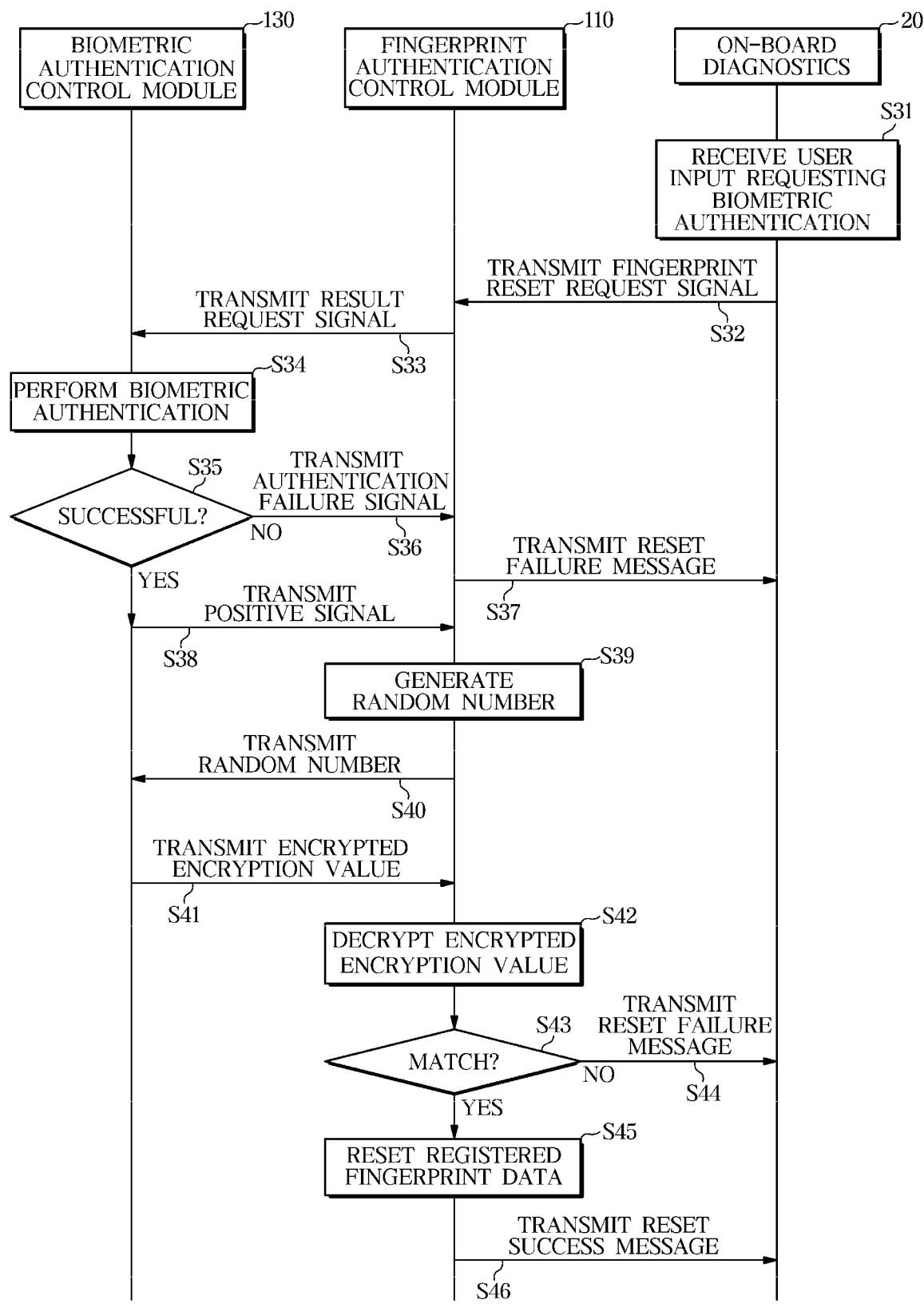
FIG. 8 is a flowchart illustrating operations of resetting registered fingerprint data through a biometric authentication control module by a fingerprint data reset system according to an embodiment.

FIG. 8 is a flowchart illustrating operations of resetting registered fingerprint data through a biometric authentication control module by a fingerprint data reset system according to an embodiment.

Referring to FIG. 8, a user may request biometric authentication other than fingerprint authentication through the third element C3.

According to a user's selection on the third element C3, the on-board diagnostics 20 may receive a user input requesting the biometric authentication from the user (S31).

In this instance, a user input for resetting registered fingerprint data may include the user input requesting the biometric authentication.

The on-board diagnostics 20 may transmit a fingerprint reset request signal to the fingerprint authentication control module 110 (S32), based on receiving the user input for resetting registered fingerprint data. In this instance, the fingerprint reset request signal may include a command requesting the biometric authentication other than fingerprint authentication.

The fingerprint authentication control module 110 may transmit, to the biometric authentication control module 130, a result request signal for requesting a result of biometric authentication (S33), based on receiving the fingerprint reset request signal including the command requesting the biometric authentication.

The biometric authentication control module 130 may perform the biometric authentication, based on the result request signal received from the fingerprint authentication control module 110 (S34).

For example, a face authentication control module, which is an example of the biometric authentication control module 130, may perform a face authentication process that compares a reference face image with a face image input from a camera, based on the result request signal received from the fingerprint authentication control module 110.

As another example, an iris authentication control module, which is an example of the biometric authentication control module 130, may perform an iris authentication process that compares reference iris data with iris data input from a camera, based on the result request signal received from the fingerprint authentication control module 110.

The biometric authentication control module 130 may transmit an authentication failure signal (S36), based on a failure in biometric authentication (No in operation S35).

For example, based on the biometric authentication having failed until a preset period of time (e.g. one minute) has elapsed from a time of receiving the result request signal, the biometric authentication control module 130 may transmit the authentication failure signal to the fingerprint authentication control module 110 (S36).

The fingerprint authentication control module 110 may transmit a reset failure message to the on-board diagnostics 20 (S37), based on receiving the authentication failure signal.

The biometric authentication control module 130 may transmit a positive signal to the fingerprint authentication control module 110 (S38), based on a success in biometric authentication (Yes in operation S35).

For example, based on the biometric authentication having succeeded within a preset period of time (e.g. one minute) from a time of receiving the result request signal, the biometric authentication control module 130 may transmit the positive signal to the fingerprint authentication control module 110 (S38).

As illustrated in FIG. 8, according to various embodiments, the fingerprint authentication control module 110 may reset the registered fingerprint data (S45), based on the positive signal received from the biometric authentication control module 130.

That is, in an embodiment, based on the success in biometric authentication other than fingerprint authentication, the fingerprint authentication control module 110 may determine that the user input for resetting the registered fingerprint data is received from a real user of the vehicle 10.

In another embodiment, as illustrated in FIG. 8, even when the positive signal is received from the biometric authentication control module 130, the fingerprint authentication control module 110 may proceed with additional processes, thereby blocking an unauthenticated user.

For example, based on the positive signal received from the biometric authentication control module 130, the fingerprint authentication control module 110 may generate a random number (S39), and transmit the generated random number to the biometric authentication control module 130 (S40).

In this instance, the fingerprint authentication control module 110 may generate the random number using an algorithm for generating a random number, and temporarily store information about the generated random number.

Based on the random number received from the fingerprint authentication control module 110, the biometric authentication control module 130 may encrypt a pre-stored encryption value which is obtained by encrypting a unique PIN and a unique VIN of the vehicle 10, and transmit the encrypted pre-stored encryption value to the fingerprint authentication control module 110 (S41).

That is, the biometric authentication control module 130 may encrypt the pre-stored encryption value once again, based on the random number.

The fingerprint authentication control module 110 may decrypt the encrypted pre-stored encryption value received from the biometric authentication control module 130 (S42).

For example, the fingerprint authentication control module 110 may decrypt the encrypted pre-stored encryption value, received from the biometric authentication control module 130, based on the random number transmitted by the fingerprint authentication control module 110 itself to the biometric authentication control module 130 (S42).

The fingerprint authentication control module 110 may transmit a reset failure message to the on-board diagnostics 20 (S44), based on a value obtained by decrypting the encrypted pre-stored encryption value received from the biometric authentication control module 130 (hereinafter, 'decrypted value') not including the pre-stored encryption value (No in operation S43).

The fingerprint authentication control module 110 may reset the registered fingerprint data (S45), based on the decrypted value including the pre-stored encryption value (Yes in operation S43).

Also, the fingerprint authentication control module 110 may transmit a reset success message to the on-board diagnostics 20 (S46), based on a success in resetting the registered fingerprint data.

Although not illustrated, according to various embodiments, a user may reset a password set in the telematics terminal 140 using the above-described fingerprint data reset method. In this case, the telematics terminal 140 may perform operations of the fingerprint authentication control module 110.

According to the disclosure, a real user may easily perform identity authentication through a biometric authentication means other than a PIN and a VIN.

Also, according to the disclosure, a pre-stored encryption value may be encrypted once more based on a random number, thereby preventing others from hacking into an in-vehicle network to steal the pre-stored encryption value.

According to the disclosure, even when a vehicle password set through a telematics terminal is lost, a real user may delete registered fingerprint data through an on-board diagnostics.

In addition, according to the disclosure, registered fingerprint data may be deleted only when identity authentication is successful through various authentication means applied to a vehicle, thereby enhancing security of a fingerprint authentication control module and easily resetting the registered fingerprint data.

Further, according to the disclosure, even when a new owner of a vehicle does not know a vehicle password set through a telematics terminal, the new owner may delete registered fingerprint data through an on-board diagnostics, thereby preventing a former owner of the vehicle from stealing the vehicle.

Meanwhile, a portion of the constituent components of the on-board diagnostics 20 and the vehicle 10 may include a software component and/or a hardware component such as field-programmable gate array (FPGA) and application specific integrated circuit (ASIC).

As is apparent from the above, according to the disclosure, the fingerprint data reset system and the fingerprint data reset method can reset fingerprint data registered in a vehicle, when an owner of the vehicle forgets a password of the vehicle.

Also, according to the disclosure, when an owner of a vehicle changes, but the owner of the vehicle does not know a password of the vehicle, fingerprint data registered in the vehicle can be reset.

Also, according to the disclosure, only an administrator having an authority to inquire vehicle information can reset fingerprint data registered in a vehicle, thereby preventing vehicle theft.

Also, according to the disclosure, when an owner of a vehicle is authenticated by another authentication means, registered fingerprint data can be easily reset through on-board diagnostics.

Also, according to the disclosure, whether another authentication means is a real authentication means for authenticating an owner of a vehicle can be determined through a cryptographic communication, thereby enhancing security.

Embodiments can be stored in the form of a recording medium storing computer-executable instructions. The instructions may be stored in the form of a program code, and when executed by a processor, the instructions may perform operations of the disclosed embodiments. The recording medium may be implemented as a computer-readable recording medium.

The computer-readable recording medium includes all kinds of recording media in which instructions which may be decoded by a computer are stored of, for example, a read only memory (ROM), random access memory (RAM), magnetic tapes, magnetic disks, flash memories, optical recording medium, and the like.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. A fingerprint data reset system, comprising:
a vehicle comprising a first controller configured to authenticate input fingerprint data based on comparison between the input fingerprint data and registered fingerprint data; and
an on-board diagnostics configured to communicate with a plurality of controllers of the vehicle through an in-vehicle communication network of the vehicle,
wherein the on-board diagnostics is configured to display a first element for inputting a personal identification number (PIN) and a vehicle identification number (VIN), a second element for determining a location of a digital key, and a third element for a biometric authentication, and transmit a fingerprint reset request signal to the first controller among the plurality of controllers based on receiving a user input for resetting the registered fingerprint data, and
the first controller is configured to determine whether the user input is received from a user of the vehicle based on the fingerprint reset request signal, and reset the registered fingerprint data based on a determination that the user input is received from the user of the vehicle,
wherein the fingerprint reset request signal includes a command to request authentication of the PIN and the VIN input by the user, a command to request authentication of a digital key, or a command to request a biometric authentication other than fingerprint authentication,
wherein the first controller is configured to:
(i) generate an encryption value corresponding to the PIN and the VIN input by the user, and determine a first positive signal based on the generated encryption value matching a pre-stored encryption value which is set by encrypting a unique PIN and a unique VIN of the vehicle, and wherein the unique PIN and the unique VIN of the vehicle are invariable according to a setting of the user, or
(ii) transmit a search request signal for requesting identification of the location of the digital key, to a second controller among the plurality of controllers, based on receiving the command to request authentication of the digital key,
the second controller is configured to identify the location of the digital key, based on the search request signal received from the first controller, and transmit a second positive signal to the first controller based on the location of the digital key being identified to be located in the vehicle, or
(iii) transmit a result request signal for requesting a result of the biometric authentication, to a third controller among the plurality of controllers, based on receiving the command to request the biometric authentication, the third controller is configured to perform the biometric authentication, based on the result request signal received from the first controller, and transmit a third positive signal to the first controller based on the biometric authentication being successful, and
based on whether the first positive signal, the second positive signal, or the third positive signal is received, the first controller is configured to reset the registered fingerprint data based on at least one of the first positive signal, the second positive signal, or the third positive signal was received.

2. The fingerprint data reset system of claim 1, wherein the fingerprint reset request signal includes a command to request authentication of a digital key,
the first controller is configured to transmit a random number to the second controller based on a positive signal received from the second controller,
the second controller is configured to encrypt a pre-stored encryption value which is obtained by encrypting a unique PIN and a unique VIN of the vehicle, based on the random number received from the first controller, and transmit the encrypted pre-stored encryption value to the first controller, and
the first controller is configured to decrypt the encrypted pre-stored encryption value received from the second controller, based on the random number, and reset the registered fingerprint data based on the decrypted value including the pre-stored encryption value.

3. The fingerprint data reset system of claim 1, wherein the vehicle further comprises a telematics terminal configured to provide a user interface for managing a registered fingerprint of the vehicle, and
the telematics terminal is configured to transmit a request signal for resetting the registered fingerprint data to the first controller, based on a password, included in a fingerprint reset command received through the user interface, matching a pre-stored password.

4. A fingerprint data reset method for resetting registered fingerprint data stored in a first controller of a vehicle, the fingerprint data reset method comprising:
communicating, by an on-board diagnostics, with a plurality of controllers of the vehicle through an in-vehicle communication network of the vehicle;
displaying, by the on-board diagnostics, a first element for inputting a personal identification number (PIN) and a vehicle identification number (VIN), a second element for determining a location of a digital key, and a third element for a biometric authentication,
(i) receiving, by the on-board diagnostics, a user input for selecting the first element, and the PIN and the VIN input by the user to generate,
by the first controller, an encryption value corresponding to the PIN and the VIN input by the user, and determining, by the first controller, a first positive signal based on the generated encryption value matching a pre-stored encryption value which is set by encrypting a unique PIN and a unique VIN of the vehicle, and wherein the unique PIN and the unique VIN of the vehicle are invariable according to a setting of the user; or (ii) receiving, by the on-board diagnostics, a user input for selecting the second element to transmit, by the first controller, a search request signal for requesting identification of a location of the digital key, to a second controller among the plurality of controllers and to identify, by the second controller, the location of the digital key, based on the search request signal received from the first controller, and transmitting a second positive signal to the first controller based on the location of the digital key being identified to be located in the vehicle; or (iii) receiving, by the on-board diagnostics, a user input for selecting the third element to transmit, by the first controller, a result request signal for requesting a result of the biometric authentication, to a third controller among the plurality of controllers, based on receiving a command to request the biometric authentication and to perform, by the third controller, the biometric authentication based on the result request signal received from the first controller, and transmitting a third positive signal to the first controller based on the biometric authentication being successful;

determining, by the first controller, whether the first positive signal, the second positive signal, or the third positive signal was received, and resetting the registered fingerprint data based on at least one of the first positive signal, the second positive signal, or the third positive signal was received.

5. The fingerprint data reset method of claim 4, further comprising:

providing, by a telematics terminal of the vehicle, a user interface for managing a registered fingerprint of the vehicle; and transmitting, by the telematics terminal, a request signal for resetting the registered fingerprint data to the first controller, based on a password, included in a fingerprint reset command received through the user interface, matching a pre-stored password.

* * * * *